(12) United States Patent
Nakamura

(10) Patent No.: US 11,095,862 B2
(45) Date of Patent: Aug. 17, 2021

(54) OPTICAL MODULE HAVING PIXEL SHIFTING MECHANISM TRANSITIONING TO FIRST STATE OR SECOND STATE, METHOD FOR CONTROLLING THE SAME, AND PROJECTION-TYPE DISPLAY APPARATUS

(71) Applicant: SEIKO EPSON CORPORATION, Tokyo (JP)

(72) Inventor: Norio Nakamura, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 16/824,796

(22) Filed: Mar. 20, 2020

(65) Prior Publication Data

US 2020/0304765 A1    Sep. 24, 2020

(30) Foreign Application Priority Data

Mar. 22, 2019  (JP) .............................. JP2019-054299

(51) Int. Cl.
*H04N 9/31* (2006.01)
*G03B 21/14* (2006.01)
*G03B 21/00* (2006.01)

(52) U.S. Cl.
CPC ......... *H04N 9/3188* (2013.01); *G03B 21/006* (2013.01); *G03B 21/147* (2013.01)

(58) Field of Classification Search
CPC .. G03B 21/142; G03B 21/147; G03B 21/006; H04N 9/3188; H04N 9/3161; H04N 9/3164; G09G 3/007; G09G 3/005
See application file for complete search history.

(56) References Cited

U.S. PATENT DOCUMENTS

| | | | | |
|---|---|---|---|---|
| 5,784,038 A * | 7/1998 | Irwin | .................... | H04N 9/3114 345/32 |
| 7,255,448 B2 * | 8/2007 | Greer | .................... | G09G 3/3413 348/742 |
| 7,549,756 B2 * | 6/2009 | Willis | .................. | H04N 9/3114 353/50 |
| 2006/0082560 A1 * | 4/2006 | Greer | .................... | G09G 3/3413 345/204 |

(Continued)

FOREIGN PATENT DOCUMENTS

JP    H04-063332 A    2/1992
JP    2019-53241 A    4/2019

*Primary Examiner* — Bao-Luan Q Le
(74) *Attorney, Agent, or Firm* — Oliff PLC

(57) ABSTRACT

An optical module includes a light modulator that modulates light and includes a plurality of pixels, and a pixel shift mechanism. The pixels of the light modulator each include a first sub-pixel on which a first or a second color light flux is incident, a second sub-pixel on which a color light flux different from the color light flux incident on the first sub-pixel out of the first and the second color light flux is incident, and a third sub-pixel and a fourth sub-pixel on which a third color light flux is incident. The pixel shift mechanism transition to a first state in which the third sub-pixel is located on a first position and the fourth sub-pixel is located on a second position, or a second state in which the third sub-pixel is located on a third position and the fourth sub-pixel is located on a fourth position.

20 Claims, 6 Drawing Sheets

(56) References Cited

U.S. PATENT DOCUMENTS

| | | | |
|---|---|---|---|
| 2006/0082562 A1* | 4/2006 | Childers | H04N 9/3111 345/204 |
| 2007/0109502 A1* | 5/2007 | Willis | H04N 9/3114 353/32 |
| 2016/0173838 A1* | 6/2016 | Maeda | H04N 9/3188 348/745 |
| 2021/0041774 A1* | 2/2021 | Fukuma | G03B 21/14 |

* cited by examiner

OPTICAL MODULE HAVING PIXEL SHIFTING MECHANISM TRANSITIONING TO FIRST STATE OR SECOND STATE, METHOD FOR CONTROLLING THE SAME, AND PROJECTION-TYPE DISPLAY APPARATUS

The present application is based on, and claims priority from JP Application Serial Number 2019-054299, filed Mar. 22, 2019, the disclosure of which is hereby incorporated by reference herein in its entirety.

BACKGROUND

1. Technical Field

The present disclosure relates to an optical module, a method for controlling the same, and a projection-type display apparatus.

2. Related Art

JP-A-4-63332 discloses a single-plate projector using one liquid crystal panel as a light modulator. The projector includes a liquid crystal panel for polarization direction control that functions as a pixel shift mechanism that shifts the optical path of video image light having passed through the liquid crystal panel to shift the position of each pixel projected on a screen. The liquid crystal panel for polarization direction control shifts the optical path in a predetermined direction by switching applied voltage from ON to OFF and vice versa. Pixel shift that moves the pixel position of each pixel projected on the screen is thus performed.

In JP-A-4-63332, an image signal representing pixels the number of which is greater than the number of pixels of the liquid crystal panel is broken down into a plurality of image signals, which are then displayed in a time division manner in synchronization with the shift operation. For example, to perform pixel shift that shifts the pixels by half the pixel interval in one direction (such as horizontal direction or 45-degree oblique direction), an image displayed in the form of one frame is broken down into two images, which are switched from one to the other in synchronization with the shift operation. On the other hand, to perform pixel shift that shifts the pixels by half the pixel interval in two directions (horizontal and vertical directions), an image displayed in the form of one frame is broken down into four images, and the displayed image is switched from one of the four images to another in synchronization with the shift operation because the combination of the shift directions creates four shift positions. As a result, since the image displayed on the screen is switched from one of the four images to another in synchronization with the pixel shift using pixel shift interval smaller than the pixel interval, the apparent number of pixels can be increased, whereby the resolution of the image projected on the screen can be increased.

In the method for increasing the resolution of a displayed image based on the pixel shift, images corresponding to the shift positions are displayed in a time division manner in one frame in accordance with the number of shift positions. It is therefore necessary to drive the liquid crystal panel and the pixel shift mechanism at high speed, and fast-response driving of the liquid crystal panel and the pixel shift mechanism is therefore required. For example, to display images each formed of 60 frames per second, and to change each of the images four times in one frame in synchronization with the shift operation, the liquid crystal panel needs to switch the contents displayed at the pixels in a cycle of 1/240 (sec) (240 Hz).

In the case of a liquid crystal panel, however, it takes time for the liquid crystal material to respond to a change in pixel potential, so that asynchronization between each of the images displayed in a time division manner and the corresponding shift position could occur. It is therefore difficult to allow the pixel shift to improve the display quality.

SUMMARY

An optical module according to the present disclosure is an optical module including a light modulator that modulates light incident thereon on a pixel basis and a pixel shift mechanism. The pixels of the light modulator each include a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident. The pixel shift mechanism transitions to a first state in which a light flux modulated by the third sub-pixel is incident on a first position and a light flux modulated by the fourth sub-pixel is incident on a second position or a second state in which the light flux modulated by the third sub-pixel is incident on a third position and the light flux modulated by the fourth sub-pixel is incident on a fourth position. The first color light and then the second color light are incident on the first sub-pixel and the second color light and then the first color light are incident on the second sub-pixel during a period for which the image shift mechanism operates in the first state, and the second color light and then the first color light are incident on the first sub-pixel and the first color light and then the second color light are incident on the second sub-pixel during a period for which the image shift mechanism operates in the second state.

A projection-type display apparatus according to the present disclosure includes the optical module described above and a projection optical system that enlarges and projects video image light incident from the optical module.

An optical module controlling method according to the present disclosure is a method for controlling an optical module including a light modulator that modulates light incident thereon on a pixel basis and a pixel shift mechanism. The pixels of the light modulator each include a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident. The method includes causing the first color light and then the second color light to be incident on the first sub-pixel and the second color light and then the first color light to be incident on the second sub-pixel during a period for which a light flux modulated by the third sub-pixel is incident on a first position and a light flux modulated by the fourth sub-pixel is incident on a second position and causing the second color light and then the first color light to be incident on the first sub-pixel and the first color light and then the second color light to be incident on the second sub-pixel during a period for which the light flux modulated by the third sub-pixel is incident on a third position and the light flux modulated by the fourth sub-pixel is incident on a fourth position.

DESCRIPTION OF EXEMPLARY EMBODIMENTS

Figure 1:
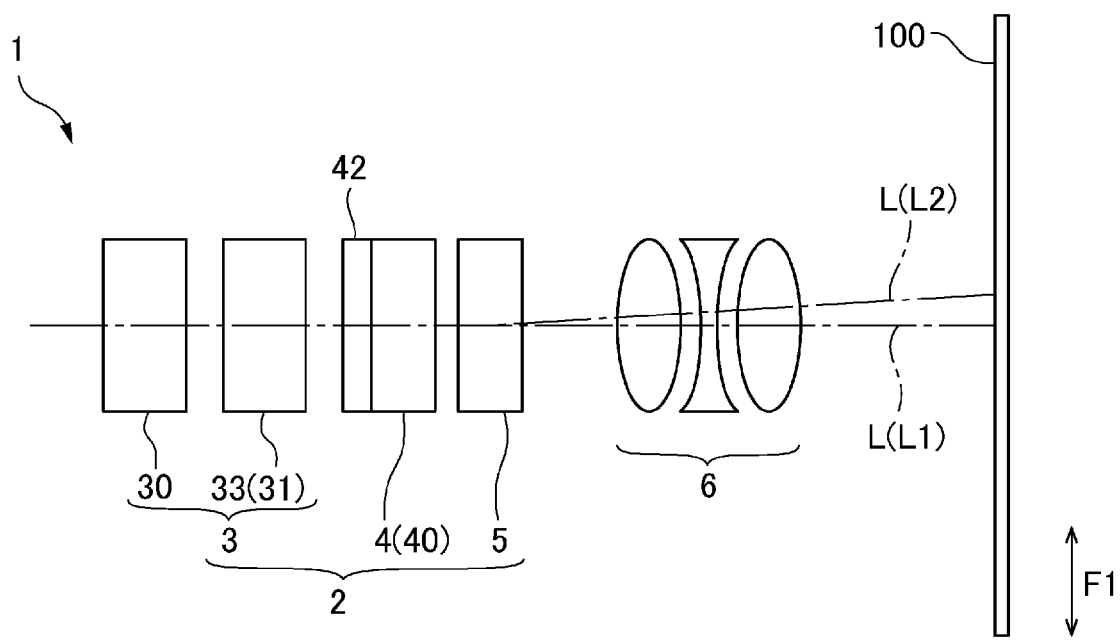
FIG. 1 is a descriptive diagram showing the optical configuration of a projector that is an example of a projection-type display apparatus including an optical module according to an embodiment of the present disclosure.

An exemplary embodiment of the present disclosure will be described below with reference to the drawings. FIG. 1 is a descriptive diagram showing the optical configuration of a projector 1, which is an example of a projection-type display apparatus including an optical module 2 according to the present embodiment. The projector 1 is an apparatus that displays video images on a screen 100 based on an externally inputted video signal. The projector 1 includes the optical module 2 and a projection optical system 6. The optical module 2 includes a light source section 3, a light modulator 4 and a pixel shift mechanism 5. The projector 1 shown in FIG. 1 is what is called a single-plate projector in which one light modulator 4 modulates three color light fluxes, R light (red light), G light (green light), and B light (blue light). In the present specification, the R light (red light) is a first color light flux, the B light (blue light) is a second color light flux, and the G light (green light) is a third color light flux.

The light source section 3 includes a light source 30, which outputs the R light, the G light, and the B light, and an optical system 31, which causes the R light, the G light, and the B light outputted from the light source 30 to be incident on each pixel of the light modulator 4. The light source 30 can, for example, be a laser light source, such as a semiconductor laser. The light source 30 may have a configuration different from the configuration of a laser light source. For example, dichroic mirrors that selectively reflect the R light, the G light, and the B light, color filters that selectively transmit the R light, the G light, and the B light, and other optical elements and a white light source may be used to output the R light, the G light, and the B light.

The light modulator 4, specifically, each pixel 10 thereof modulates the R light, the G light, and the B light outputted from the light source section 3 in accordance with image information to produce full-color video image light L. In the present embodiment, the light modulator 4 is a transmissive liquid crystal panel 40. The video image light L outputted from the light modulator 4 enters the projection optical system 6 via the pixel shift mechanism 5, and the projection optical system 6 enlarges the video image light L and projects the enlarged video image light L on the screen 100.

Figure 2:
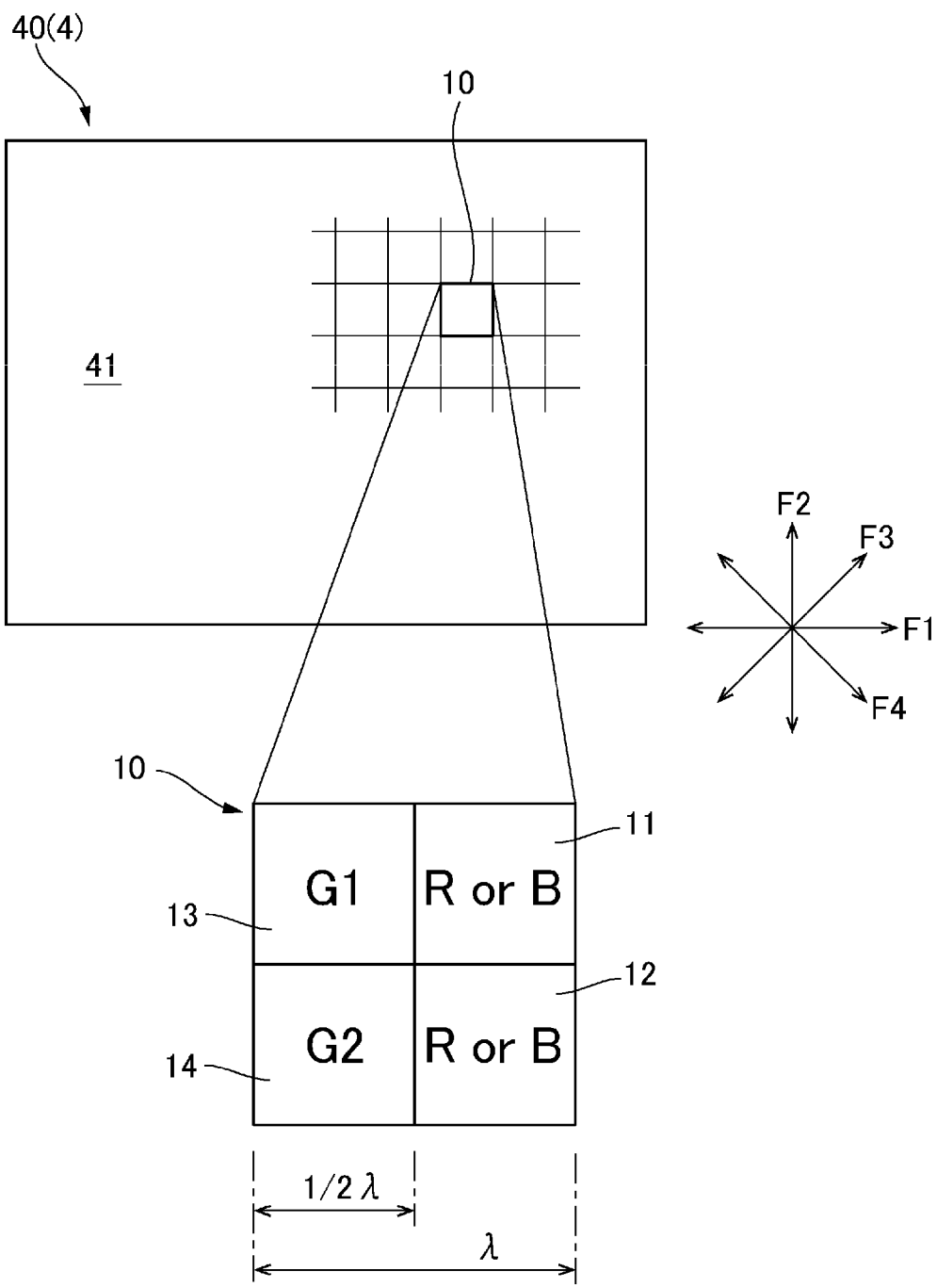
FIG. 2 is a descriptive diagram diagrammatically showing the planar configuration of pixels of a liquid crystal panel.

FIG. 2 is a descriptive diagram diagrammatically showing the planar configuration of the pixels 10 of the liquid crystal panel 40. The pixels 10 are arranged in a matrix in a display area 41 of the liquid crystal panel 40. In FIG. 2, the pixels 10 are displayed at a scale greater than the actual scale. The pixels 10 each include four sub-pixels arranged in two directions, two sub-pixels arranged in a first direction F1, which is the scan direction of the liquid crystal panel 40, and two sub-pixels arranged in a second direction F2, which is perpendicular to the first direction F1. The pixels 10 each include a first sub-pixel 11, a second sub-pixel 12, a third sub-pixel 13, and a fourth sub-pixel 14, as shown in FIG. 2. The first sub-pixel 11 and the second sub-pixel 12 are arranged in the second direction F2, so are the third sub-pixel 13 and the fourth sub-pixel 14. The second sub-pixel 12 and the fourth sub-pixel 14 are arranged in the first direction F1 in positions different in the second direction F2 from the positions of the first sub-pixel 11 and the third sub-pixel 13. Further, when one of the first direction F1 and the second direction F2 is the row direction, and the other is the column direction, the first sub-pixel 11, the second sub-pixel 12, the third sub-pixel 13, and the fourth sub-pixel 14 are arranged in a matrix formed of two rows and two columns.

The four sub-pixels that form each of the pixels 10 receive the R light, the G light, and the B light as follows: One of the R light and the B light is incident on the first sub-pixel 11. Out of the R light and the B light, the color light flux different from the color light flux incident on the first sub-pixel 11 is incident on the second sub-pixel 12. For example, the R light is incident on the first sub-pixel 11, and the B light is incident on the second sub-pixel 12. Instead, the B light is incident on the first sub-pixel 11, and the R light is incident on the second sub-pixel 12. The G light is incident on the third sub-pixel 13 and the fourth sub-pixel 14. The G light incident on the third sub-pixel 13 is called G1 light, and the G light incident on the fourth sub-pixel 14 is called G2 light, as shown in FIG. 2.

The liquid crystal panel 40 includes a microlens array 42, in which microlenses are arranged at the same interval as a pixel interval $\lambda$ in the liquid crystal panel 40, as shown in FIG. 1. The R light, the G light (G1 light and G2 light), and the B light incident on the microlens array 42 at angles different from one another are collected and directed to different sub-pixels in each of the pixels 10 of the light modulator 4. The optical system 31 includes a light incident position swapping mechanism 33, which swaps the R light incident position and the B light incident position. In the light source section 3, the light incident position swapping mechanism 33 swaps the R light and the B light and causes the R light and the B light to be alternately incident on the first sub-pixel 11 and the second sub-pixel 12, which are part of each of the pixels 10, by swapping the R light incident position and the B light incident position.

Figure 3:
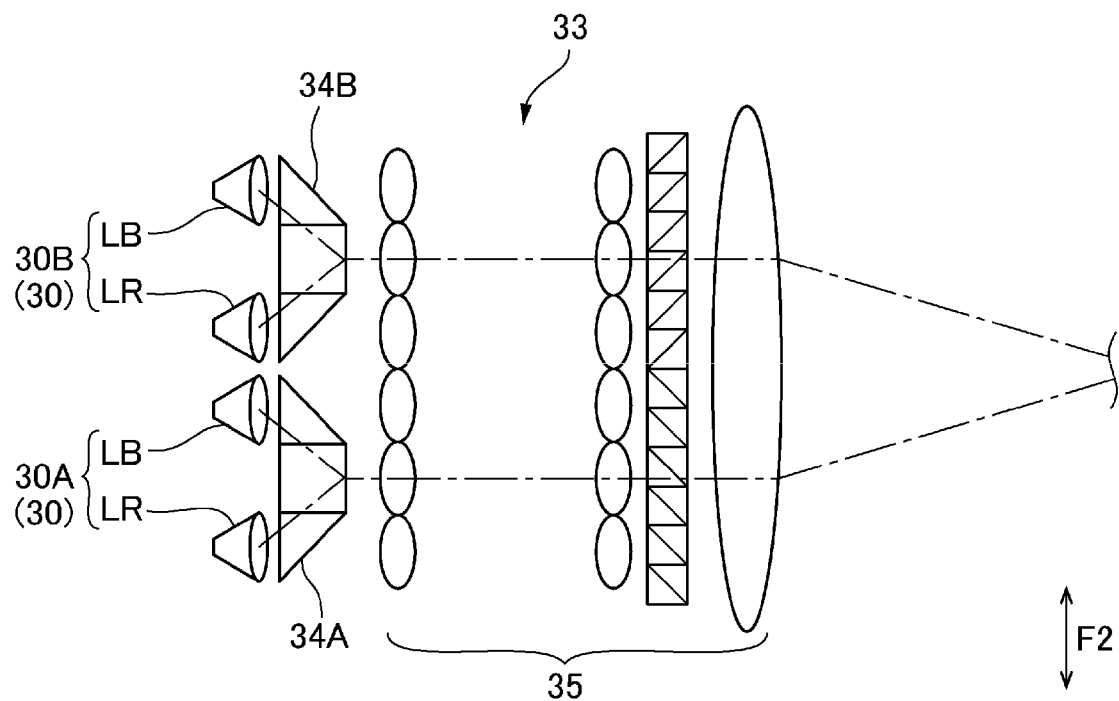
FIG. 3 is descriptive diagram diagrammatically showing part of a light source and a light incident position swapping mechanism.

FIG. 3 is descriptive diagram diagrammatically showing part of the light source 30 and a light incident position swapping mechanism 33. In FIG. 3, a light source that outputs the G light is omitted. In the present embodiment, the light source 30 includes a first light source 30A and a second light source 30B. The first light source 30A and the second light source 30B each include one laser light source LR for R light and one laser light source LB for B light. The first light source 30A and the second light source 30B are each so turn-on/off controlled that only one of the laser light source LR for R light and the laser light source LB for B light outputs light. The first light source 30A and the second light source 30B are so synchronously controlled that the turned-on laser light sources output color light fluxes different from each other. That is, when the laser light source LR for R light of the first light source 30A is turned on and remains on, and the laser light source LB for B light of the first light source 30A is turned off and remains off, the second light source 30B is so controlled that the laser light source LR for R light is turned off and remains off and the laser light source LB for B light is turned on and remains on. On the other hand, when the laser light source LR for R light of the first light source 30A is turned off and remains off, and the laser light source LB for B light of the first light source 30A is turned on and remains on, the second light source 30B is so controlled that the laser light source LR for R light is turned on and remains on and the laser light source LB for B light is turned off and remains off. In the present embodiment, the color light flux outputted from the first light source 30A is incident on the first sub-pixel 11. The color light flux outputted from the second light source 30B is incident on the second sub-pixel 12.

The light incident position swapping mechanism 33 includes a first optical element 34A, a second optical element 34B, and a third optical element 35. The R light and the B light outputted from the first light source 30A enter the first optical element 34A. The R light and the B light outputted from the second light source 30B enter the second optical element 34B. The light fluxes having exited out of the first optical element 34A and the second optical element 34B enter the third optical element 35. The first optical element 34A outputs the incident R light and B light along the same optical path. The second optical element 34B also outputs the incident R light and B light along the same optical path.

The color light fluxes that exit out of the first optical element 34A and the second optical element 34B and enter the third optical element 35 is radiated to the microlens array 42 via the third optical element 35. The color light flux from the first optical element 34A and the color light flux from the second optical element 34B are incident on the microlens array 42 at different angles. The color light flux from the first optical element 34A is incident on the first sub-pixel 11 via the microlens array 42. The color light flux from the second optical element 34B is incident on the second sub-pixel 12 via the microlens array 42. The turn-on/off control of the laser light source LR for R light and the laser light source LB for B light in each of the first light source 30A and the second light source 30B therefore allows swap of the R light and the B light to cause the R light and the B light to be alternately incident on the first sub-pixel 11 and the second sub-pixel 12.

The pixel shift mechanism 5 is disposed between the light modulator 4 and the projection optical system 6. The pixel shift mechanism 5 shifts the position where the video image light L outputted from the light modulator 4 is projected on the screen 100 (performs what is called pixel shift). The pixel shift mechanism 5 is, for example, a mechanism that shifts the optical path of the video image light L based on refraction by changing the attitude of an actuator-driven light transmissive substrate that transmits the video image light L, such as a glass plate.

In the present embodiment, the pixel shift mechanism 5 shifts the optical path of the video image light L in the first direction F1. The shift operation therefore causes the pixels 10 to be shifted from each other in the first direction F1 and displayed on the screen 100. The pixel shift mechanism 5 includes a mechanism that swings the light transmissive substrate that transmits the video image light L around a predetermined axial line as the mechanism that shifts the optical path in the first direction F1. For example, to shift the optical path in the first direction F1, the light transmissive substrate is swung around a first axial line perpendicular to the first direction F1.

The pixel shift mechanisms does not necessarily have the configuration described above. For example, the pixel shift mechanism 5 may instead be configured to electrically change the state of refraction performed by an optical element that transmits the video image light L. A panel shift mechanism can still instead be used. In this case, a piezoelectric actuator, a stepper motor, or any other actuator is used to move the liquid crystal panel 40 itself in a pixel shift direction to shift the position where the video image light L is projected on the screen 100.

The pixel shift mechanism 5 can be configured to be capable of part or entirety of the pixel shift in the first direction F1, pixel shift in the second direction F2, and pixel shift in one of a third direction F3 and a fourth direction F4, which are the diagonal directions of each of the pixels 10. Positions on the screen 100 that are the positions on which the pixels 10 are projected can thus be shifted from each other in part or entirety of the first direction F1, the second direction F2, the third direction F3, and the fourth direction F4.

To shift the optical path in the second direction F2, the pixel shift mechanism 5 swings the light transmissive substrate around a second axial line perpendicular to the second direction F2. To shift the optical path in the third direction F3 or the fourth direction F4, the swing around the first axial line and the swing around the second axial line may be combined with each other, or the light transmissive substrate may be swung around a third axial line perpendicular to the third direction F3 or a fourth axial line perpendicular to the fourth direction F4.

In the present embodiment, the pixel shift operation performed by the pixel shift mechanism 5 and the operation of swapping the R light and the B light performed by the light incident position swapping mechanism 33 are performed at different timings to increase the resolution of a full-color display image displayed on the screen 100. The pixel shift direction is a direction that intersects the direction in which the two sub-pixels on which the G1 light and the G2 light are incident (third sub-pixel 13 and fourth sub-pixel 14 in present embodiment) are arranged. In the present embodiment, the direction in which the third sub-pixel 13 and the fourth sub-pixel 14 are arranged is the second direction F2, as shown in FIG. 2. In this case, the pixel shift direction is the first direction F1. In this case, the pixel shift direction can instead be the third direction F3 or the fourth direction F4, as will be described later.

A description will be made of control of the optical module 2 so performed that the pixel shift operation and the operation of swapping the R light and the B light at different timings with reference to the case where the pixel shift direction is the first direction F1. As shown in FIG. 1, the pixel shift mechanism 5 transitions to a first state in which the video image light L travels along a first optical path L1 and a second state in which the video image light L travels along a second optical path L2. In the present embodiment, the pixel shift mechanism changes the optical path of the video image light L by swinging the light transmissive substrate. The first state is therefore the state in which the light transmissive substrate is so located that the video image light L travels along the first optical path L1. The second state is the state in which the light transmissive substrate is so located that the video image light L travels along the second optical path L2. The second optical path L2 is an optical path that is the first optical path L1 shifted in the first direction F1. In FIG. 1, the amount of shift of the second optical path L2 from the first optical path L1 is greater than the actual value.

Figure 4:
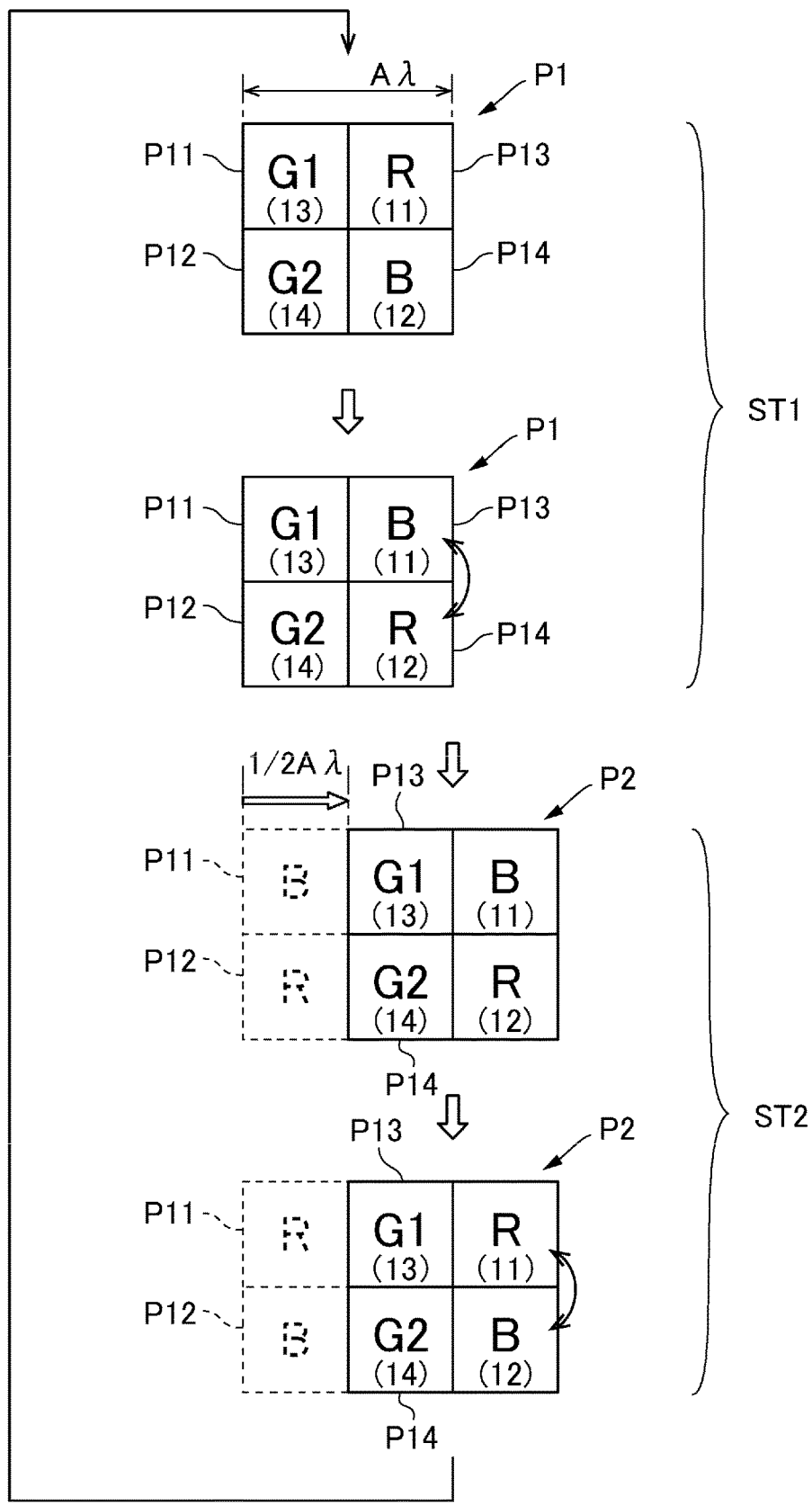
FIG. 4 is a state transition diagram showing changes in a shift position resulting from pixel shift and swaps of color light fluxes incident on sub-pixels.

FIG. 4 is a state transition diagram showing changes in the shift position resulting from the pixel shift and the swap of the color light fluxes incident on the sub-pixels. A first shift position P1 and a second shift position P2 shown in FIG. 4 are the on-projection-surface positions where the video image light L is projected and are, in the present embodiment, positions on the screen 100 that are the positions where the light fluxes modulated by the pixels 10 are projected. As shown in FIG. 2, the pixel interval on the screen 100 is $A\lambda$, where the pixel interval in the liquid crystal panel 40 is $\lambda$, and the projection magnification in the projection on the screen 100 is A. As shown in FIG. 4, the light fluxes modulated by the sub-pixels of each of the pixels 10 of the liquid crystal panel 40 are projected for a fixed period alternately on the first shift position P1 and the second shift position P2 on the screen 100 achieved by the one-direction pixel shift operation, the second shift position P2 being the position shifted from the first shift position P1 in the first direction F1 by half the pixel interval $A\lambda$ on the screen 100. The first shift position P1 is the projection position in the first state, in which the video image light L travels along the first optical path L1, and the second shift position P2 is the projection position in the second state, in which the video image light L travels along the second optical path L2.

The optical module 2 carries out the following two steps once in a one-frame period in which the display screen of the liquid crystal panel 40 is rewritten once: a first display step ST1 of displaying an image in the first shift position P1; and a second display step ST2 of displaying an image in the second shift position P2. In the one-direction pixel shift, in which the number of shift positions is two, the shift position is changed in the cycle that is half the one-frame rewriting cycle. For example, when images each formed of 60 frames per second are displayed, the shift position is changed 120 times per second or in a cycle of 120 Hz.

In the present specification, the first shift position P1, which is a projection position on the screen 100 where the light fluxes modulated by each of the pixels 10 are projected, is divided into four areas in the form of a lattice formed of two rows and two columns, two areas in the first direction F1 and two areas in the second direction F2, and the four areas are called a first position P11, a second position P12, a third position P13, and a fourth position P14, as shown in FIG. 4. The first position P11, the second position P12, the third position P13, and the fourth position P14 are areas arranged at the pixel interval that is half the pixel interval AA on the screen 100. The first position P11 and the third position P13 are arranged in the first direction F1, which is the pixel shift direction, and the second position P12 and the fourth position P14 are arranged in the first direction F1 but differ in the second direction F2, which intersects the first direction F1, from the first position P11 and the third position P13.

The pixel shift mechanism 5 performs first shift operation in which the state of the pixel shift mechanism 5 transitions from the first state to the second state and second shift operation in which the state of the pixel shift mechanism 5 transitions from the second state to the first state. The first shift operation and the second shift operation are each operation of shifting the projection position of the video image light L on the screen 100 in the first direction F1. The first shift operation is operation of shifting the projection position of the video image light L toward one side of the first direction F1, and the second shift operation is operation of shifting the projection position of the video image light L toward the other side of the first direction F1. In the present embodiment, the first shift operation is operation of swinging the light transmissive substrate toward one side around the first axial line perpendicular to the first direction F1, and the second shift operation is operation of swinging the light transmissive substrate toward the other side around the first axial line.

In the first state in which the light fluxes modulated by each of the pixels 10 are incident on the first shift position P1, the light flux modulated by the third sub-pixel 13 (G1 light) is incident on the first position P11, the light flux modulated by the fourth sub-pixel 14 (G2 light) is incident on the second position P12, the light flux modulated by the first sub-pixel 11 (R light or B light) is incident on the third position P13, and the light flux modulated by the second sub-pixel 12 (out of R light or B light, color light flux different from color light flux incident on first sub-pixel 11) is incident on the fourth position P14, as shown in FIG. 4.

When the first state transitions to the second state, in which the light fluxes modulated by the pixel 10 are incident on the second shift position P2, the light fluxes having been incident on the first position P11 and the second position P12 move to the third position P13 and the fourth position P14, respectively. Therefore, in the second state, the light flux modulated by the third sub-pixel 13 is incident on the third position P13, and the light flux modulated by the fourth sub-pixel 14 is incident on the fourth position P14. In the second state, the light flux modulated by the first sub-pixel 11 and the second sub-pixel 12 of the adjacent pixel 10 are incident on the first position P11 and the second position P12.

The light source section 3 causes the G light (G1 light or G2 light) to be incident on the third sub-pixel 13 and the fourth sub-pixel 14 both in the first and second states. That is, the light fluxes incident on the third sub-pixel 13 and the fourth sub-pixel 14 do not change during one frame. On the other hand, the R light and the B light are swapped and incident on the first sub-pixel 11 and the second sub-pixel 12 in the first state. Similarly, the R light and the B light are swapped and incident on the first sub-pixel 11 and the second sub-pixel 12 in the second state.

The light source section 3 causes the R light and then the B light to be incident on the first sub-pixel 11 and the B light and then the R light to be incident on the second sub-pixel 12 in the first display step ST1, which is the period for which the image shift mechanism 5 operates in the first state. That is, in the first display step ST1, the state of the first light source 30A is switched from the state in which the laser light source LR for R light is turned on and remains on and the laser light source LB for B light is turned off and remains off to the state in which the laser light source LR for R light is turned off and remains off and the laser light source LB for B light is turned on and remains on. Further, in the first display step ST1, the state of the second light source 30B is switched from the state in which the laser light source LR for R light is turned off and remains off and the laser light source LB for B light is turned on and remains on to the state in which the laser light source LR for R light is turned on and remains on and the laser light source LB for B light is turned off and remains off.

The light source section 3 causes the B light and then the R light to be incident on the first sub-pixel 11 and the R light and then the B light to be incident on the second sub-pixel 12 in the second display step ST2, which is the period for which the image shift mechanism 5 operates in the second state. That is, in the second display step ST2, the state of the first light source 30A is switched from the state in which the laser light source LR for R light is turned off and remains off and the laser light source LB for B light is turned on and remains on to the state in which the laser light source LR for R light is turned on and remains on and the laser light source LB for B light is turned off and remains off. Further, in the second display step ST2, the state of the second light source 30B is switched from the state in which the laser light source LR for R light is turned on and remains on and the laser light source LB for B light is turned off and remains off to the state in which the laser light source LR for R light is turned off and remains off and the laser light source LB for B light is turned on and remains on.

As described above, the first display step ST1 and the second display step ST2 differ from each other in such a way that the order in which the R light and the B light are displayed is reversed. Therefore, at the first sub-pixel 11 and the second sub-pixel 12, the R light and the B light only need to be swapped once in the first state and once more in the second state in a one-frame display period, and the R light and B light are not swapped at the pixel shift timing. The B light and the R light are therefore swapped in the cycle that is half a one-frame rewriting cycle. For example, when images each formed of 60 frames per second are displayed, the B light and the R light are swapped 120 times per second or in the cycle of 120 Hz.

The pixel shift in the first direction F1 and the swap of the R light and the B light to be incident on the sub-pixels arranged in a direction that intersects the first direction F1 are performed in the same cycle and shifted from each other by a predetermined period (period that is half the cycle of the pixel shift, for example). As a result, all the color light fluxes, the R light, the B light, and the G light, are projected in a time division manner in the first position P11, the second position P12, the third position P13, and the fourth position P14. That is, the three color light fluxes are projected in a time division manner on the first position P11 in the following order: G1 light→G1 light→B light→R light, and the three color light fluxes are projected in a time division manner on the second position P12 in the following order: G2 light→G2 light→R light→B light. The three color light fluxes are projected in a time division manner on the third position P13 in the following order: R light→B light→G1 light→G1 light, and the three color light fluxes are projected in a time division manner on the fourth position P14 in the following order: B light→R light→G2 light→G2 light.

As described above, the modulated R light, B light, and G light (G1 light or G2 light) can be projected in a time division manner in a one-frame display period on all the areas in the first position P11, the second position P12, the third position P13, and the fourth position P14. The four areas can therefore be displayed based on the superposition of the R light, the B light, and the G light (G1 light or G2 light) on one another as if the four areas were independent pixels, whereby the resolution in the first direction F1 and the second direction F2 can be apparently doubled. An image having increased resolution can therefore be displayed.

Primary Operational Effects of Present Embodiment

As described above, the optical module 2 according to the present embodiment includes the light modulator 4, which modulates light incident thereon for each of the pixels 10, and the pixel shift mechanism 5, and the pixels 10 of the light modulator 4 each include the first sub-pixel 11, on which the first color light flux (R light) or the second color light flux (B light) is incident, the second sub-pixel 12, on which the color light flux different from the color light flux incident on the first sub-pixel 11 out of the first color light flux (R light) and the second color light flux (B light) is incident, and the third sub-pixel 13 and the fourth sub-pixel 14, on which the third color light flux (G1 light, G2 light) is incident. The pixel shift mechanism 5 transitions to the first state, in which the light flux modulated by the third sub-pixel 13 is incident on the first position P11 and the light flux modulated by the fourth sub-pixel 14 is incident on the second position P12, or the second state, in which the light flux modulated by the third sub-pixel 13 is incident on the third position P13 and the light flux modulated by the fourth sub-pixel 14 is incident on the fourth position P14. Further, the first color light flux (R light) and then the second color light flux (B light) are incident on the first sub-pixel 11 and the second color light flux (B light) and then the first color light flux (R light) are incident on the second sub-pixel 12 during the period for which the image shift mechanism 5 operates in the first state, and the second color light flux (B light) and then the first color light flux (R light) are incident on the first sub-pixel 11 and the first color light flux (R light) and then the second color light flux (B light) are incident on the second sub-pixel 12 during the period for which the image shift mechanism 5 operates in the second state.

The method for controlling the optical module 2 according to the present embodiment causes the first color light flux (R light) and then the second color light flux (B light) to be incident on the first sub-pixel 11 and the second color light flux (B light) and then the first color light flux (R light) to be incident on the second sub-pixel 12 during the period for which the light flux modulated by the third sub-pixel 13 is incident on the first position P11 and the light flux modulated by the fourth sub-pixel 14 is incident on the second position P12 and causes the second color light flux (B light) and then the first color light flux (R light) to be incident on the first sub-pixel 11 and the first color light flux (R light) and then the second color light flux (B light) to be incident on the second sub-pixel 12 during the period for which the light flux modulated by the third sub-pixel 13 is incident on the third position P13 and the light flux modulated by the fourth sub-pixel 14 is incident on the fourth position P14.

As described above, in the present embodiment, the pixel shift in the first direction F1 and the swap of the R light and the B light to be incident on the first sub-pixel 11 and the second sub-pixel 12 are performed in the same cycle and shifted from each other by a period shorter than each cycle (period that is half of each cycle, for example). The modulated R light, B light, and G light (G1 light or G2 light) can thus be projected in a time division manner in one frame on the four areas in the first position P11, the second position P12, the third position P13, and the fourth position P14 on the screen 100. The four areas can therefore be displayed based on the superposition of the R light, the B light, and the G light (G1 light or G2 light) on one another as if the four areas were independent pixels, whereby the resolution in the first direction F1 and the second direction F2 can be apparently doubled. An image having increased resolution can therefore be displayed.

In the present embodiment, the pixel shift is performed in one direction, and the number of shift positions is two. The number of shift positions is therefore so smaller that the frequency of the pixel shift is lower than in the case where the pixel shift in two directions produces four shift positions to increase the resolution. The frequency of switching of the contents displayed at the sub-pixels in synchronization with the pixel shift therefore decreases. The proportion of the period for which the asynchronization between the contents displayed at the sub-pixels and a shift position occurs is therefore small. A decrease in the display quality due to the asynchronization between a shift position and a display content is therefore small, whereby the increase in the resolution can improve the display quality.

In the liquid crystal panel 40, which sequentially drives the pixels 10 arranged in the display area 41, it takes a time period corresponding to a reciprocal of the frame frequency to drive the pixels 10 from one end to the other end of the display area 41, so that there is an in-plane time difference, which could result in the asynchronization between the contents displayed at the sub-pixels that perform time-division display operation and a shift position. On the other hand, the frequency of switching of the contents displayed at the sub-pixels in synchronization with the pixel shift is small in the present embodiment, as described above, which means a small proportion of the period for which the asynchronization between the contents displayed at the sub-pixels and a shift position occurs due to the in-plane time difference resulting from the operation of driving the liquid crystal material in the sequential writing scheme. The increase in the resolution can therefore improve the display quality even when a low-response-speed liquid crystal material is used.

In the present embodiment, only the G light is incident on the third sub-pixel 13 and the fourth sub-pixel 14 for one frame, and the color of the color light flux incident on the third sub-pixel 13 and the fourth sub-pixel 14 does not change. No asynchronization between a display content and a shift position therefore occurs at the third sub-pixel 13 or the fourth sub-pixel 14. At the first sub-pixel 11 and the second sub-pixel 12, the color light fluxes only need to be swapped in the cycle that is half the one-frame rewriting cycle, so that the frequency of color light flux swapping is small. The asynchronization between the color light flux swapping and a shift position is therefore unlikely to occur. Further, in the present embodiment, in which a mechanism independent of the pixel shift mechanism 5 swaps the color light fluxes, the timing at which the color light fluxes are swapped is readily adjusted. The contents displayed at the first sub-pixel 11 and the second sub-pixel 12 are therefore readily synchronized with a shift position, so that a decrease in the display quality due to the asynchronization is unlikely to occur. As described above, in the present embodiment, a decrease in the display quality due to the asynchronization between a shift position and a display content is unlikely to occur, whereby the increase in the resolution achieved by the pixel shift can improve the display quality, even when a liquid crystal material slow in response speed is used.

In the present embodiment, the third color light flux, which is incident on the fixed sub-pixels, is the G light (green light). The G light (green light) is a color light flux to which a human eye has large visual sensitivity and which greatly contributes to the brightness of an image as compared with the R light (red light) and the B light (blue light). Light having a wavelength of 555 nm, which is a yellowish green color light flux, is the brightest color light flux. Therefore, light having the wavelength that provides the highest brightness (555 nm), for example, a color light flux that belongs to a wavelength band ranging from 500 to 600 nm can be used as the G light (green light). Further, a color light flux that belongs to a wavelength band ranging from 610 to 750 nm can, for example, be used as the R light (red light), and a color light flux that belongs to a wavelength band ranging from 430 to 460 nm can, for example, be used as the B light (blue light). Using the G light (green light), to which a human eye is most sensitive among the three color light fluxes, as the third color light flux, the content displayed by which is not switched for one frame, allows stabilization of the display operation using the G light. A decrease in the brightness due to the asynchronization can therefore be suppressed. Further, the G light is incident on two of the four sub-pixels, which means that the number of sub-pixels on which the G light is incident is greater than the number of sub-pixels on which any of the other color light fluxes is incident. The brightness is therefore readily ensured, whereby the display quality can be improved.

Moreover, the sub-pixel on which the B light (blue light), which has a short wavelength that is most likely to cause degradation of the liquid crystal material out of the three color light fluxes, is incident is changed, continuous irradiation of a specific sub-pixel with the B light (blue light) can be suppressed. Degradation of the liquid crystal material can therefore be suppressed.

In the present embodiment, the first position P11 and the third position P13 are arranged in the first direction F1, and the second position P12 and the fourth position P14 are arranged in the first direction F1 but differ in the second direction F2, which intersects the first direction F1, from the first position P11 and the third position P13. The R light, the G light, and the B light can therefore be projected on the four areas in a time division manner so that the areas can be displayed as if they were apparently independent pixels. The resolution in the first direction F1 and the second direction F2 can therefore be doubled.

In the present embodiment, the first sub-pixel 11 and the third sub-pixel 13 are arranged in the first direction F1, along which the first position P11 and the third position P13 are connected to each other, and the second sub-pixel 12 and the fourth sub-pixel 14 are arranged in the first direction F1 in positions different in the second direction F2 from the positions of the first sub-pixel 11 and the third sub-pixel 13. Further, when one of the first direction F1 and the second direction F2 is the row direction, and the other is the column direction, the first sub-pixel 11, the second sub-pixel 12, the third sub-pixel 13, and the fourth sub-pixel 14 are arranged in a matrix formed of two rows and two columns. In the arrangement described above, combining the pixel shift in one direction with the swap of the color light fluxes incident on the first sub-pixel 11 and the second sub-pixel 12 allows the R light, the B light, and the G light to be projected in a time division manner on the four areas arranged in the form of a lattice formed of two rows and two columns on the projection surface as if the four areas were apparently independent pixels. The resolution in the first direction F1 and the second direction F2 can therefore be doubled. Further, the number of shift positions is so smaller that the frequency of the pixel shift is lower than in the case where the pixel shift in two directions produces four shift positions to move to increase the resolution, whereby the frequency of switching of the contents displayed at the sub-pixels in synchronization with the pixel shift decreases. The proportion of the period for which the asynchronization between the contents displayed at the sub-pixels and a shift position occurs is therefore small. A decrease in the display quality due to the asynchronization between the contents displayed at the sub-pixels and a shift position is therefore small even in the configuration in which the pixel shift is performed, whereby the increase in the resolution can improve the display quality.

In the present embodiment, the pixel shift mechanism 5 performs the first shift operation, in which the state of the pixel shift mechanism 5 transitions from the first state to the second state, and the second shift operation, in which the state of the pixel shift mechanism 5 transitions from the second state to the first state. The pixel shift mechanism 5 therefore only needs to include a mechanism that repeatedly makes one-direction reciprocating motion, therefore needs no complicated mechanism, and is also readily controlled.

In the present embodiment, the pixel shift mechanism 5 shifts the projection position of the video image light L modulated by the light modulator 4 in the first shift operation and the second shift operation. The third sub-pixel 13 and the fourth sub-pixel 14 are arranged in the second direction F2, which intersects the first direction F1 which is the direction in which the projection position of the video image light L is shifted. As described above, the color light fluxes incident on the third sub-pixel 13 and the fourth sub-pixel 14, which are arranged in a direction that intersects the pixel shift direction, do not need to be changed, and the swap of the optical paths of the color light fluxes incident on the other two sub-pixels and the shift operation in one direction allow an increase in the resolution. Further, since the number of sub-pixels at which the optical paths are swapped is small, the configuration of the light source section 3 can be simplified.

The pixel shift mechanism 5 only needs to be a mechanism that shifts the projection position of the video image light L modulated by the light modulator 4. In the present embodiment, the pixel shift mechanism 5 is an optical path shifting mechanism that shifts the optical path of the video image light L outputted from the light modulator 4 based on refraction by changing the attitude of the light transmissive substrate to shift the position where the video image light L is projected on the screen 100. A panel shift mechanism that shifts the position of the liquid crystal panel 40, which is the light modulator 4, can instead be used.

The optical modules 2 according to the present embodiment includes the light source section 3, which causes the first color light flux (R light), the second color light flux (B light), and the third color light flux (G light) to be incident on the light modulator 4, and can be used in a projection-type display apparatus, such as the projector 1 including the projection optical system 6, which enlarges and projects the video image light L incident from the optical module 2, whereby the resolution of an image projected on the screen 100 can be increased. The optical modules 2 according to the present embodiment can further suppress a decrease in brightness of the image projected on the screen 100.

Variations (1) The above embodiment has been described with reference to the case where the pixel shift direction is the first direction F1. Also in a case where the pixel shift direction is another direction, the same display operation can be similarly achieved by the pixel shift in one direction and the swap of the R light and the B light incident on two sub-pixel. The arrangement of the sub-pixels (first sub-pixel 11 and the second sub-pixel 12) irradiated with the R light and the B light in the case where the pixel shift direction is the first direction F1 is not limited to the arrangement in the embodiment described above.

Figure 5:
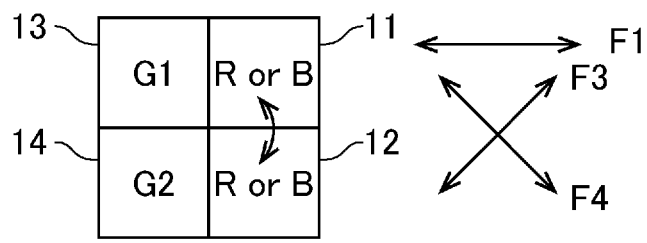
FIG. 5 is a descriptive diagram showing an example of the combination of the arrangement of the sub-pixels and the pixel shift direction in a variation.
Figure 5:
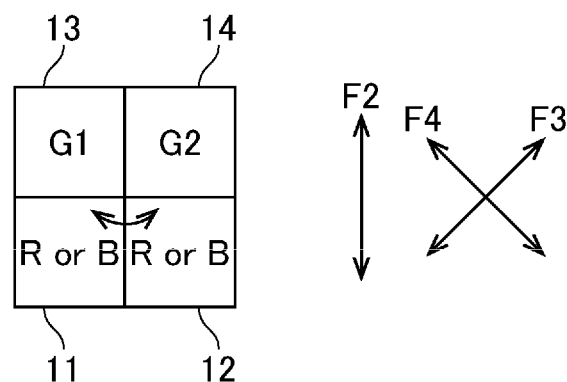
Figure 5:
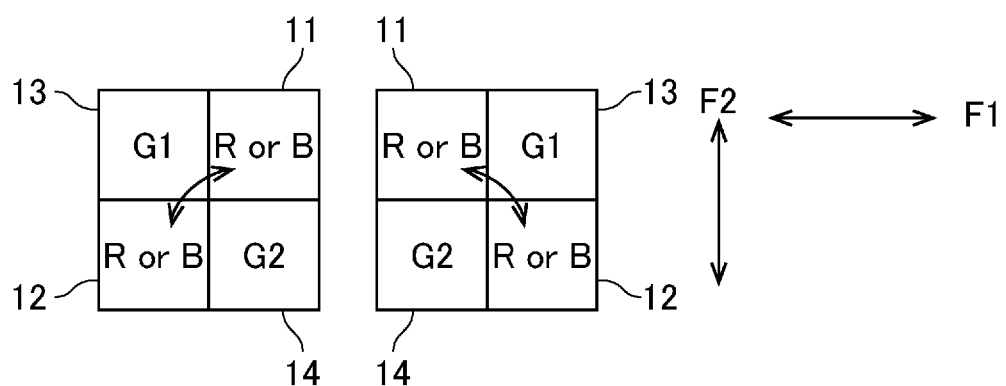

FIG. 5 is a descriptive diagram showing an example of the combination of the arrangement of the sub-pixels and the pixel shift direction in a variation. As shown in FIG. 5, when the first sub-pixel 11 and the second sub-pixel 12 are arranged in the second direction F2, the pixel shift direction only needs to be a direction that intersects the second direction F2 and may be a diagonal direction (third direction F3 or fourth direction F4) in place of the first direction F1. When the first sub-pixel 11 and the second sub-pixel 12 are arranged in the first direction F1, the pixel shift direction can be the second direction F2 or a diagonal direction (third direction F3 or fourth direction F4). When the first sub-pixel 11 and the second sub-pixel 12 are arranged in a diagonal direction, the pixel shift direction can be the first direction F1 or the second direction F2. The same display operation as that in the embodiment described above can be achieved in any of the combinations described above.

Figure 6:
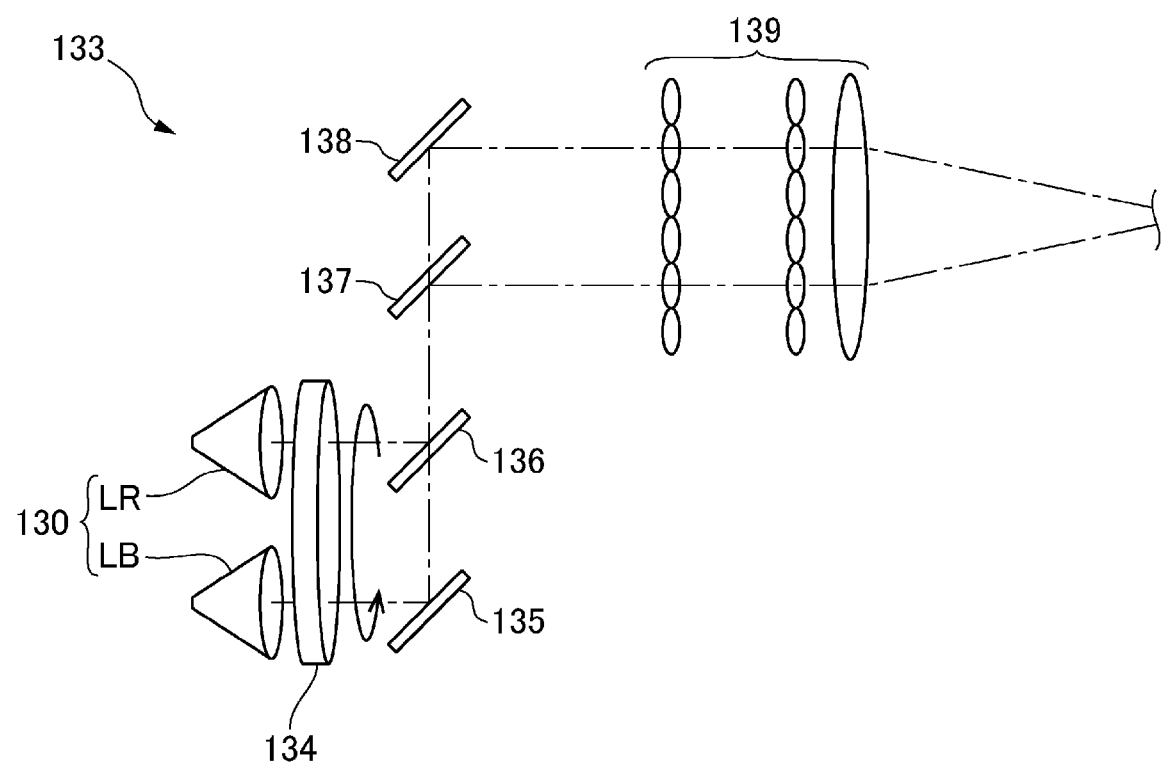
FIG. 6 is descriptive diagram diagrammatically showing part of a light source section and a light incident position swapping mechanism in a variation.

(2) The mechanism that swaps the R light and the B light does not necessarily have the configuration in the embodiment described above. FIG. 6 is descriptive diagram diagrammatically showing part of a light source section 130 and a light incident position swapping mechanism 133 in a variation. In FIG. 6, a light source that outputs the G light is omitted. The light source section 130 in the variation includes one laser light source LR for R light and one laser light source LB for B light, as shown in FIG. 6. The light incident position swapping mechanism 133 includes a transparent rotary plate 134 with a semicircular retardation film, a mirror 135 for reflecting B light, a dichroic mirror 136 for reflecting R light, a reflective polarizer 137, a visible-light reflection mirror 138, and an optical element 139.

The light incident position swapping mechanism 133 in the variation causes the phase of the R light to be shifted by half the wavelength of the R light and the R light to reach the dichroic mirror 136 for reflecting R light in the period corresponding to half of one rotation of the transparent rotary plate 134 with a semicircular retardation film and the phase of the B light to be shifted by half the wavelength of the B light and the B light to reach the mirror 135 for reflecting B light in the period corresponding to the remaining half of one rotation of the transparent rotary plate 134 with a semicircular retardation film. After the R light and the B light are reflected off the mirror 135 for reflecting B light and the dichroic mirror 136 for reflecting R light, respectively, one of the R light and the B light is reflected off the reflective polarizer 137, and the other reaches and is reflected off the visible-light reflection mirror 138. The optical paths of the R light and the B light are therefore swapped twice and return to the initial state during one rotation of the transparent rotary plate 134 with a semicircular retardation film.

The color light fluxes that exit out of the reflective polarizer 137 and the visible light reflection mirror 138 and enter the optical element 139 are incident on the microlens array 42 via the optical element 139. In this process, the color light flux via the reflective polarizer 137 and the color light flux via the visible light reflection mirror 138 are incident on the microlens array 42 at different angles and then incident on the first sub-pixel 11 and the second sub-pixel 12. The R light and the B light can therefore be swapped and caused to be alternately incident on the first sub-pixel 11 and the second sub-pixel 12.

What is claimed is:

1. An optical module comprising:
   a light modulator that modulates light and includes a plurality of pixels;
   a pixel shift mechanism, and a light incident position swapping mechanism,
wherein the pixels of the light modulator each include a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident,
the pixel shift mechanism transitions to
  a first state in which the third sub-pixel is located on a first position and the fourth sub-pixel is located on a second position, or
  a second state in which the third sub-pixel is located on a third position and the fourth sub-pixel is located on a fourth position,
the light incident position swapping mechanism swaps the first color light for the second color light on the first sub-pixel and swaps the second color light for the first color light on the second sub-pixel, in the first state, and
the light incident position swapping mechanism swaps the second color light for the first color light on the first sub-pixel and swaps the first color light for the second color light on the second sub-pixel, in the second state.

2. The optical module according to claim 1,
wherein the pixel shift mechanism transitions to the first state or the second state in a cycle that is half a rewriting cycle for a display screen,
the light incident position swapping mechanism swaps the first color light or the second color light in a cycle that is half of the rewriting cycle for the display screen,
a timing of transitioning by the pixel shift mechanism and a timing of swapping by the light incident position swapping mechanism are different each other.

3. The optical module according to claim 1, wherein the third color light is green light.

4. The optical module according to claim 1,
wherein the first position and the third position are arranged in a first direction, and
the second position and the fourth position are arranged in the first direction but differ in a second direction that intersects the first direction from the first position and the third position.

5. The optical module according to claim 1,
wherein the first sub-pixel and the third sub-pixel are arranged in a first direction and
the second sub-pixel and the fourth sub-pixel are arranged in the first direction in positions different in a second direction that intersects the first direction from the positions of the first sub-pixel and the third sub-pixel.

6. The optical module according to claim 5,
wherein
the first sub-pixel, the second sub-pixel, the third sub-pixel, and the fourth sub-pixel are arranged in a matrix formed of two rows and two columns.

7. The optical module according to claim 1,
wherein the pixel shift mechanism performs
a first shift operation in which the pixel shift mechanism transitions from the first state to the second state, and
a second shift operation in which the pixel shift mechanism transitions from the second state to the first state.

8. The optical module according to claim 1,
wherein the pixel shift mechanism shifts an optical path of video image light modulated by the light modulator.

9. The optical module according to claim 1,
wherein the pixel shift mechanism shifts a position of the light modulator.

10. A projection-type display apparatus comprising:
the optical module according to claim 1; and
a projection optical system that enlarges and projects video image light incident from the optical module.

11. A projection-type display apparatus comprising: the optical module according to claim 2; and
a projection optical system that enlarges and projects video image light incident from the optical module.

12. A projection-type display apparatus comprising:
the optical module according to claim 3; and
a projection optical system that enlarges and projects video image light incident from the optical module.

13. A projection-type display apparatus comprising:
the optical module according to claim 4; and
a projection optical system that enlarges and projects video image light incident from the optical module.

14. A projection-type display apparatus comprising:
the optical module according to claim 5; and
a projection optical system that enlarges and projects video image light incident from the optical module.

15. A projection-type display apparatus comprising:
the optical module according to claim 6; and
a projection optical system that enlarges and projects video image light incident from the optical module.

16. A projection-type display apparatus comprising:
the optical module according to claim 7; and
a projection optical system that enlarges and projects video image light incident from the optical module.

17. A method for controlling an optical module including a light modulator, a pixel shift mechanism, and a light incident position swapping mechanism,
the light modulator modulating light and including a plurality of pixels,
the pixels of the light modulator each including a first sub-pixel on which a first color light flux or a second color light flux is incident, a second sub-pixel on which a color light flux different from the color light flux incident on the first sub-pixel out of the first color light flux and the second color light flux is incident, and a third sub-pixel and a fourth sub-pixel on which a third color light flux is incident,
the method comprising:
causing the pixel shift mechanism to transition to
  a first state in which the third sub-pixel is located on a first position and the fourth sub-pixel is located on a second position, or
  a second state in which the third sub-pixel is located on a third position and the fourth sub-pixel is located on a fourth position, and
causing the light incident position swapping mechanism to
  swap the first color light for the second color light on the first sub-pixel and swap the second color light for the first color light on the second sub-pixel, in the first state, and
  swap the second color light for the first color light on the first sub-pixel and swap the first color light for the second color light on the second sub-pixel, in the second state.

18. The method for controlling an optical module according to claim 17,
causing the first color light and then the second color light to be incident on the first sub-pixel and the second color light and then the first color light to be incident on the second sub-pixel in the first state; and
causing the second color light and then the first color light to be incident on the first sub-pixel and the first color light and then the second color light to be incident on the second sub-pixel in the second state.

19. The method for controlling an optical module according to claim 17, the method further comprising:

performing a first shift operation in which the pixel shift mechanism transitions from the first state to the second state, and performing a second shift operation in which the pixel shift mechanism transitions from the second state to the first state.

20. The method for controlling an optical module according to claim 19, the method further comprising shifting the light modulator in a direction that intersects a direction in which the third sub-pixel and the fourth sub-pixel are arranged in the first shift operation and the second shift operation.

\* \* \* \* \*